United States Patent [19]
Letosky

[11] 3,755,747
[45] Aug. 28, 1973

[54] CIRCUIT FOR PRODUCING AN OUTPUT SIGNAL PULSE OF A WIDTH EQUAL TO THE PERIOD BETWEEN SEPARATED INPUT SIGNAL PULSE PAIRS

[75] Inventor: Vincent H. Letosky, Rochester, Mich.

[73] Assignee: General Motors Corporation, Detroit, Mich.

[22] Filed: Sept. 25, 1972

[21] Appl. No.: 292,266

[52] U.S. Cl. .................. 328/133, 307/232, 328/109, 328/112
[51] Int. Cl. .................. H03d 13/00
[58] Field of Search .................. 307/232, 234, 241, 307/242, 243, 215; 328/93, 96, 104, 109, 112, 133

[56] References Cited

UNITED STATES PATENTS

| | | | |
|---|---|---|---|
| 3,205,438 | 9/1965 | Buck | 328/133 X |
| 3,328,688 | 6/1967 | Brooks | 328/133 X |
| 3,475,062 | 10/1969 | Crittenden et al. | 307/234 X |
| 3,603,889 | 9/1971 | Stevens et al. | 307/232 X |
| 3,610,954 | 10/1971 | Treadway | 307/215 X |
| 3,641,443 | 2/1972 | Zerby | 307/232 X |
| 3,693,099 | 9/1972 | Oberst | 328/109 X |
| 3,710,140 | 1/1973 | Volmerange | 328/133 |

OTHER PUBLICATIONS

Steele, "Application of Digital Integrated Circuits to Linear Phase Detection," Electronic Engineering, 1968(May)

*Primary Examiner*—Stanley D. Miller, Jr.
*Assistant Examiner*—Larry N. Anagnos
*Attorney*—Eugene W. Christen, Richard G. Stohr et al.

[57] ABSTRACT

Two J-K flip-flop circuits, initially reset to a first state in which logic 0 and logic 1 output signals are present upon the Q and $\bar{Q}$ output terminals, respectively, are triggered by respective pulses of separated input signal pulse pairs to a second state in which logic 1 and logic 0 output signals are present upon the Q and $\bar{Q}$ output terminals, respectively. First and second NAND gate circuits produce a respective output signal pulse corresponding to each input signal pulse pair of a width equal to the period between the input signal pulse pairs when one of the pulses of each input signal pulse pair is the first occurring or when the other one of the pulses of each input signal pulse pair is the first occurring, respectively, in response to the logic output signals upon the Q output terminal of the first triggered J-K flip-flop circuit and the $\bar{Q}$ output terminal of the other J-K flip-flop circuit until triggered to the second state by the other input signal pulse of the pulse pair.

6 Claims, 4 Drawing Figures

| $t_n$ | | $t_{n+1}$ | |
|---|---|---|---|
| J | K | Q | $\overline{Q}$ |
| 0 | 0 | $Q_n$ | $\overline{Q_n}$ |
| 1 | 0 | 1 | 0 |
| 0 | 1 | 0 | 1 |
| 1 | 1 | $\overline{Q_n}$ | $Q_n$ |

$t_n$-TIME PRIOR TO NEGATIVE TRANSITION OF CLOCK PULSE $t_{n+1}$-TIME SUBSEQUENT TO NEGATIVE TRANSITION OF CLOCK PULSE $Q_n$-STATE OF Q IN TIME PERIOD $t_n$

CIRCUIT FOR PRODUCING AN OUTPUT SIGNAL PULSE OF A WIDTH EQUAL TO THE PERIOD BETWEEN SEPARATED INPUT SIGNAL PULSE PAIRS

The subject invention is directed to a circuit for producing an output signal pulse of a width equal to the period between separated input signal pulse pairs.

With certain applications, for example in the digital logic instrumentation field, it is necessary to provide a signal pulse of a width equal to the period between separated input signal pulse pairs and for providing an indication of which is the first occurring.

It is, therefore, an object of this invention to provide an improved circuit for producing an output signal pulse of a width equal to the period between separated input signal pulse pairs.

It is an additional object of this invention to provide an improved circuit for producing an output signal pulse of a width equal to the period between separated input signal pulse pairs and for indicating the first occurring pulse of each of the input signal pulse pairs.

In accordance with this invention, a circuit for producing an output signal pulse of a width equal to the period between separated input signal pulse pairs is provided wherein first and second J-K flip-flop circuits, initially reset to a first state in which logic 0 and 1 output signals are present upon the Q and $\overline{Q}$ output terminals, respectively, are triggered by respective pulses of separated input signal pulse pairs to a second state in which the complementary logic output signals present upon the Q and $\overline{Q}$ output terminals are reversed and first and second NAND gate circuits produce a respective output signal pulse corresponding to each input signal pulse pair of a width equal to the period between the separated input signal pulse pairs when one of the pulses of each input signal pulse pair is the first occurring or when the other one of the pulses of each input signal pulse pair is the first occurring, respectively, in response to the logic output signals upon the Q output terminal of the first triggered J-K flip-flop circuit and the $\overline{Q}$ output terminal of the other J-K flip-flop circuit until triggered to the second state by the other input signal pulse of the pulse pair.

Figures 1, 4:
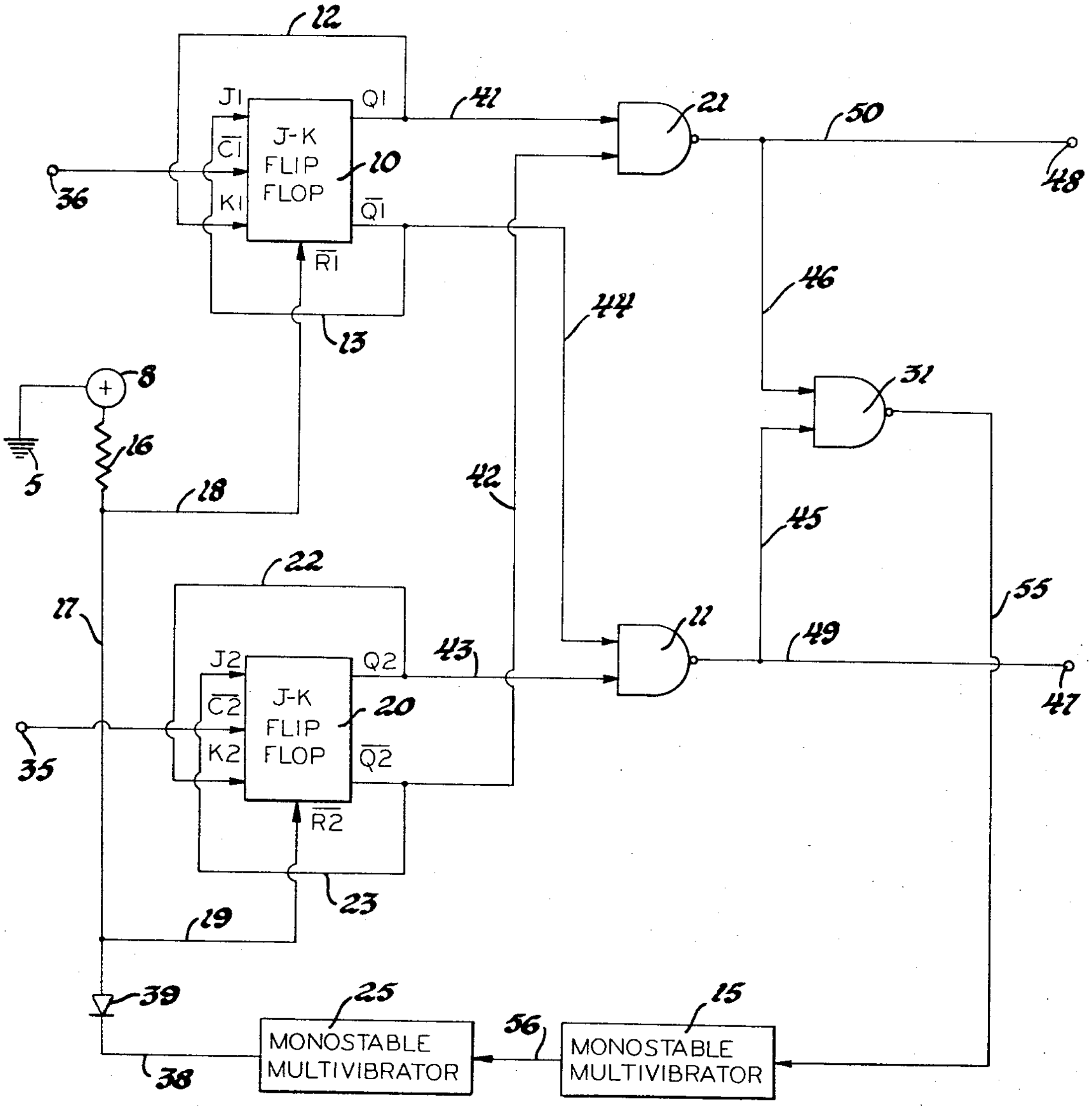
Figure 2:
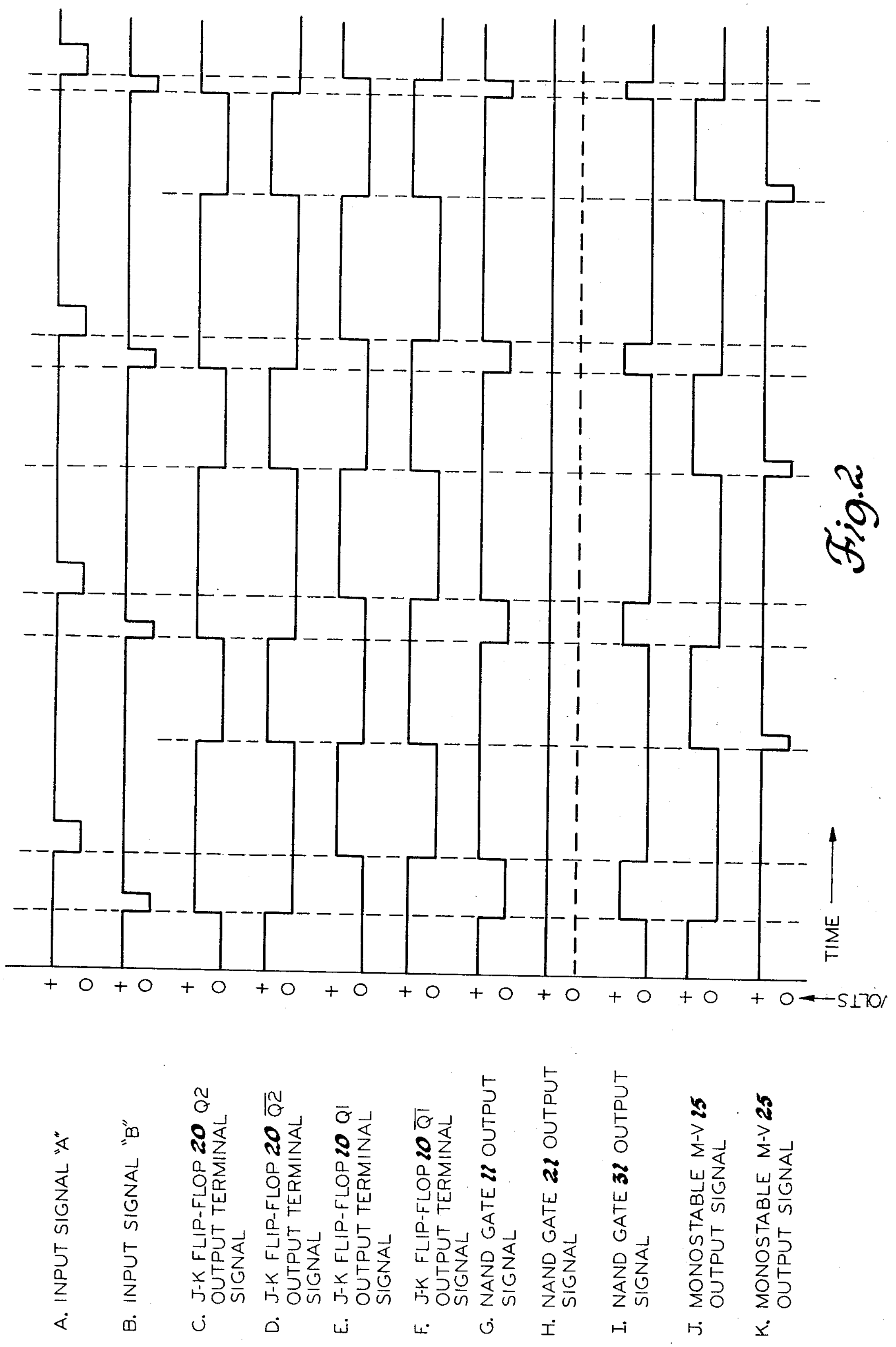
Figure 3:
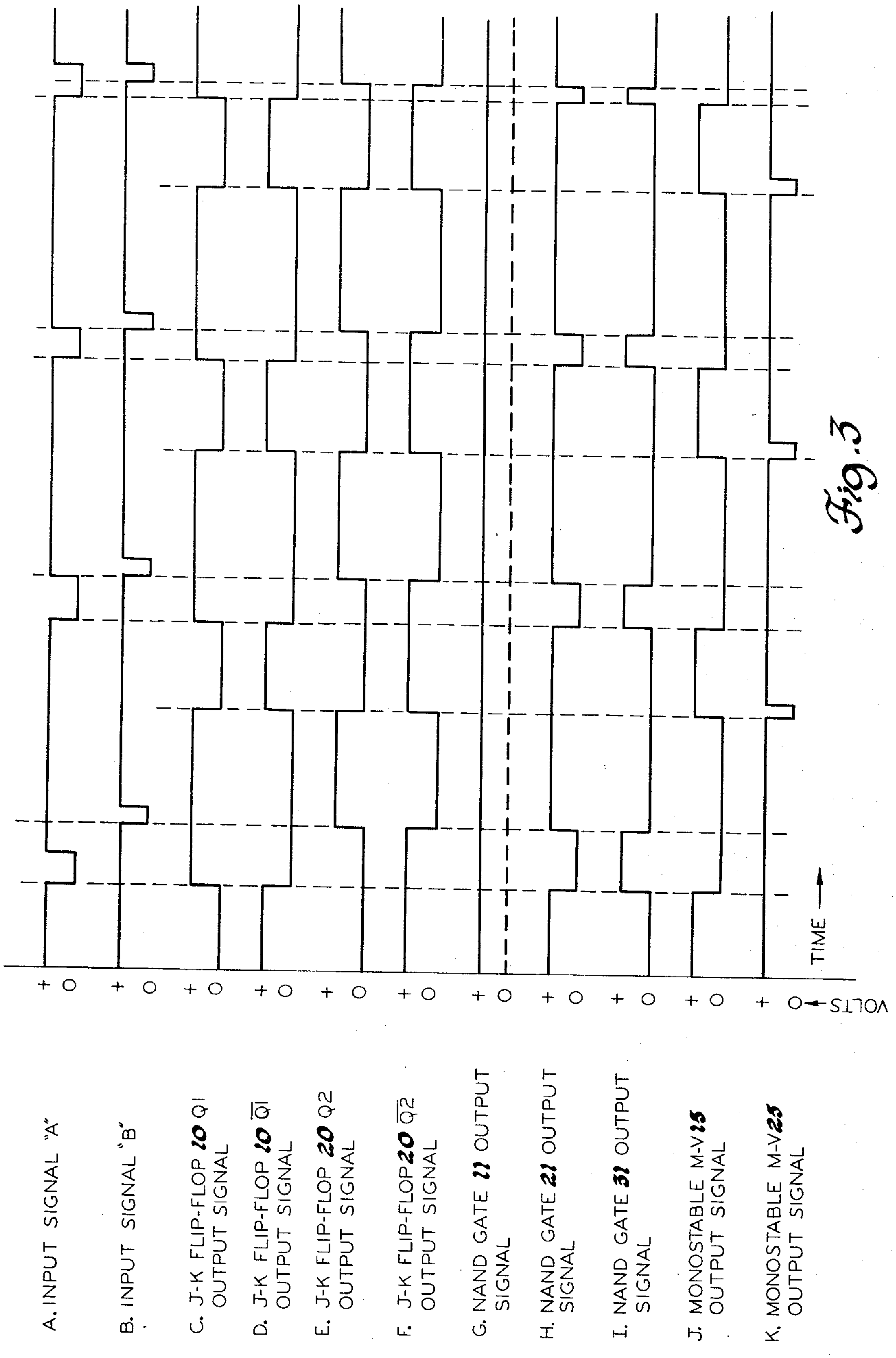

For a better understanding of the present invention together with additional objects, advantages and features thereof, reference is made to the following description and accompanying drawing in which:

FIG. 1 sets forth in schematic form the circuit of this invention for producing an output signal pulse of a width equal to the period between separated input signal pulse pairs;

FIGS. 2 and 3 are sets of curves useful in understanding the circuit of FIG. 1, and FIG. 4 is a truth table for J-K flip-flop circuits.

In accordance with logic terminology well known in the art, logic signals are referred to as being in the "High" or logic 1 state or in the "Low" or logic 0 state. For purposes of this specification and without intention or inference of a limitation thereto, the "High" or logic 1 signals will be considered to be of a positive polarity potential and the "Low" or logic 0 signals will be considered to be of zero or ground potential.

Referring to FIG. 1 of the drawing, first and second J-K flip-flop circuits, each having a J input terminal, a K input terminal, a $\overline{C}$ clock pulse input terminal, a $\overline{R}$ reset input terminal and Q and $\overline{Q}$ output terminals, are referenced by the numerals 10 and 20.

The J-K flip-flop circuit is a logic memory element well known in the art which yields a predictable output for every possible combination of pulse inputs. The J-K flip-flop circuit exhibits the properties reflected in the truth table set forth in FIG. 4 of the drawing. With a logic 1 signal maintained upon the $\overline{R}$ reset input terminal, upon the negative transition of each clock pulse applied to the $\overline{C}$ clock pulse input terminal with no signal applied to either the J or K input terminals, the J-K flip-flop circuit remains in its preexisting state; with a logic 1 signal applied to the J input terminal and a logic 0 signal applied to the K input terminal, it is triggered to the state in which a logic 1 signal appears upon the Q output terminal and a logic 0 signal appears upon the $\overline{Q}$ output terminal; with a logic 0 signal applied to the J input terminal and a logic 1 signal applied to the K input terminal, it is triggered to the state in which a logic 0 signal appears upon the Q output terminal and a logic 1 signal appears upon the $\overline{Q}$ output terminal and, with logic 1 signals simultaneously applied to both the J and K input terminals, the state of the component reverses from the state that pre-existed the application of the clock pulse. As J-K flip-flop circuits are commercially available items well known in the digital data processing art, J-K flip-flop circuits 10 and 20 have been illustrated in block form in FIG. 1. One example of a commercially available J-K flip-flop circuit suitable for use with the circuit of this invention is a type MC-663-P, marketed by the Motorola Semiconductor Products, Inc.

The Q output terminal and the K input terminal and the $\overline{Q}$ output terminal and the J input terminal of each of J-K flip-flop circuits 10 and 20 are electrically interconnected by respective leads 12 and 22 and by respective leads 13 and 23. With these interconnections, each of J-K flip-flop circuits 10 and 20 may be triggered by a signal pulse applied to the $\overline{C}$ clock pulse input terminal thereof from an initial first state in which complementary logic output signals are present upon the Q and $\overline{Q}$ output terminals to a second state in which the complementary logic output signals present upon the Q and $\overline{Q}$ output terminals are reversed. A logic 1 signal may be maintained upon the $\overline{R}$ reset input terminal of both J-K flip-flop circuits 10 and 20 by a direct current potential source, which may be a battery 8 having the negative polarity terminal connected to point of reference or ground potential 5 and the positive polarity terminal connected to the $\overline{R}$ reset input terminal of both J-K flip-flop circuits through resistor 16 and lead 17 and respective leads 18 and 19.

For purposes of this specification and without intention or inference of a limitation thereto, J-K flip-flop circuits 10 and 20 will be reset, in a manner to be later explained, initially in a first state in which a logic 0 output signal is present upon the Q output terminals and a logic 1 output signal is present upon the $\overline{Q}$ output terminals.

One of the pulses of each of the separated input signal pulse pairs, curve A of FIGS. 2 and 3, may be applied to the $\overline{C}$ clock pulse input terminal of J-K flip-flop circuit 20 through input circuit 35 and the other of the pulses of each of the separated input pulse pairs, curve B of FIGS. 2 and 3, may be applied to the $\overline{C}$ clock pulse input terminal of J-K flip-flop circuit 10 through input circuit 36. Input circuits 35 and 36 have been illustrated in FIG. 1 as terminals. It is to be specifically understood that these input circuits may be terminals or any other electrical arrangement or device through which external circuitry may be connected to the $\overline{C}$ clock pulse input terminals of respective J-K flip-flop circuits 20 and 10. Therefore, each of the pulses of the input signal pulse pairs applied to the $\overline{C}$ clock pulse input terminal of J-K flip-flop circuit 20 triggers this J-K flip-flop circuit from the initial first state to a second state in which a logic 1 output signal is present upon the Q output terminal and a logic 0 output signal is present upon the $\overline{Q}$ output terminal and each of the pulses of the input signal pulse pairs applied to the $\overline{C}$ clock pulse input terminal of J-K flip-flop circuit 10 triggers this J-K flip-flop circuit from the initial first state to a second state in which a logic 1 output signal is present upon the Q output terminal and a logic 0 output signal is present upon the $\overline{Q}$ output terminal.

To produce the output signal pulses, NAND gate circuits 11 and 21, each having two input terminals and an output terminal, are provided. NAND gate circuits are commercially available logic circuit elements well known in the art. The two input NAND gate produces a "Low" or logic 0 signal upon the output terminal with a "High" or logic 1 signal upon both input terminals and a "High" or logic 1 signal upon the output terminal with a "Low" or logic 0 signal upon any of the input terminals, as is well known in the art.

The Q1 output terminal of J-K flip-flop circuit 10 and the $\overline{Q}$2 output terminal of J-K flip-flop circuit 20 are connected to respective input terminals of NAND gate 21 through respective leads 41 and 42 and the Q2 output terminal of J-K flip-flop circuit 20 and the $\overline{Q1}$ output terminal of J-K flip-flop circuit 10 are connected to respective input terminals of NAND gate 11 through respective leads 43 and 44.

Reset circuitry responsive to the output signals of NAND gates 11 and 21 is provided for producing a reset signal and for applying the reset signal to the $\overline{R}$ reset input terminal of both J-K flip-flop circuits 10 and 20 for resetting both of these J-K flip-flop circuits to the initial first state at the conclusion of each separated input signal pulse pair. This circuitry includes NAND gate 31, having two input terminals and an output terminal, monostable multivibrator circuits 15 and 25, lead 38, diode 39, lead 17 and leads 18 and 19. The operation of this reset circuit will be explained in detail later in this specification.

Monostable multivibrator circuits 15 and 25 are conventional logic elements well known in the art having a stable condition of operation and which may be triggered to an alternate state by a logic 1 signal applied to the input terminal. While in the alternate state, these circuits supply complementary output signals for a period of time as determined by an associated RC delay network and return spontaneously to the stable state upon the conclusion of the time delay period. One example of a monostable multivibrator circuit suitable for use with this invention is a type MC-667-P marketed by Motorola Semiconductor Products, Inc.

The output terminal of each of NAND gates 11 and 21 is connected to a respective input terminal of NAND gate 31 through respective leads 45 and 46 and to respective output circuit terminals 47 and 48 through respective leads 49 and 50. While this output circuitry, through which the output terminal of each of NAND gates 11 and 21 may be connected to external circuitry, is illustrated in FIG. 1 as terminals, it is to be specifically understood that this output circuitry may be any other electrical arrangement or device through which the output terminals of NAND gates 11 and 21 may be connected to external circuitry.

The output terminal of NAND gate 31 is connected to th input terminal of monostable multivibrator 15 through lead 55, the output terminal of monostable multivibrator 15 is connected to the input terminal of monostable multivibrator 25 through lead 56, and the output terminal of monostable multivibrator 25 is connected to the $\overline{R}$ reset input terminal of both of J-K flip-flop circuits 10 and 20 through lead 38, diode 39, lead 17 and respective leads 18 and 19.

Assuming that the one of the pulses of each input signal pulse pair labeled "B" in FIG. 2, for purposes of identification, is the first occurring of each separated input signal pulse pair and that J-K flip-flop circuits 10 and 20 of FIG. 1 are in the initial first state in which a logic 0 signal is present upon the Q1 output terminal of J-K flip-flop circuit 10 and the Q2 output terminal of J-K flip-flop circuit 20, curves E and C of FIG. 2, and a logic 1 signal is present upon the $\overline{Q1}$ output terminal of J-K flip-flop circuit 10 and upon the $\overline{Q2}$ output terminal of J-K flip-flop circuit 20, curves F and D. With flip-flop circuits 10 and 20 in the initial first state, a logic 0 signal is applied to one of the input terminals of each of NAND gates 11 and 21 from the Q2 output terminal of J-K flip-flop 20 and Q1 output terminal of J-K flip-flop 10, respectively. Therefore, NAND gates 11 and 21 both produce a logic 1 output signal, curves G and H. These logic 1 output signals are applied to respective input terminals of NAND gate 31 which, therefore, produces a logic 0 output signal, curve I. The logic 0 first occurring one of the input signal pulse pairs, curve B, triggers J-K flip-flop 20 to the second state in which a logic 1 signal appears upon the Q2 output terminal and a logic 0 signal appears upon the $\overline{Q2}$ output terminal thereof, curves C and D. The logic 1 signal upon the Q2 output terminal of J-K flip-flop circuit 20, curve C, and upon the $\overline{Q1}$ output terminal of J-K flip-flop circuit 10, curve F, are applied to respective input terminals of NAND gate 11 which, therefore, produces a logic 0 output signal, curve G, and the logic 0 signal upon the Q1 output terminal of J-K flip-flop circuit 10, curve E, and the logic 0 signal upon the $\overline{Q2}$ output terminal of J-K flip-flop circuit 20, curve D, are applied to respective input terminals of NAND gate 21 which, therefore, maintains the logic 1 output signal, curve H. The logic 0 output signal of NAND gate 11 and the logic 1 output signal of NAND gate 21 are applied to respective input terminals of NAND gate 31 which, therefore, produces a logic 1 output signal, curve I, which is applied to the input terminal of monostable multivibrator 15 to this device to the alternate state in which a logic 0 signal appears upon the output terminal thereof, curve J. The logic 0 second occurring other one of the input signal pulse pairs, curve A, triggers J-K flip-flop circuit 10 to the second state in which a logic 1 signal is present upon the Q1 output terminal and a logic 0 signal is present upon the $\overline{Q1}$ output terminal thereof, curves E and F. The logic 0 signal upon the $\overline{Q1}$ output terminal of J-K flip-flop circuit 10 and the logic 1 signal present upon the Q2 output terminal of J-K flip-flop circuit 20 are applied to respective input terminals of NAND gate 11 which, therefore, produces a logic 1 output signal, curve G, and the logic 1 signal upon the Q1 output terminal of J-K flip-flop circuit 10 and the logic 0 signal upon the $\overline{Q2}$ output terminal of J-K flip-flop circuit 20 are applied to respective input terminals of NAND gate 21 which, therefore, maintains the logic 1 output signal, curve H, upon the output terminal thereof. The logic 1 output signal of NAND gate 11 and the logic 1 output signal of NAND gate 21 are applied to respective input terminals of NAND gate 31 which, therefore, produces a logic 0 output signal, curve I, which is applied to the input terminal of monostable multivibrator 15 but does not affect the condition thereof. Since the delay period designed into monostable multivibrator 15 has not elapsed, this device remains in the alternate state with a logic 0 signal present upon the output terminal thereof. At the conclusion of the delay period designed into monostable multivibrator 15, it spontaneously returns to the stable state in which a logic 1 signal, curve J, is present upon the output terminal thereof which, applied to the input terminal of monostable multivibrator 25, triggers this device to the alternate state in which a logic 0 reset signal is present upon the output terminal thereof, curve K. This logic 0 reset signal is applied to the $\overline{R}$ reset input terminals of both J-K flip-flop circuits 10 and 20 to reset these devices to the initial first state in which a logic 0 signal is present upon the $\overline{Q1}$ output terminal of J-K flip-flop circuit 10 and the $\overline{Q2}$ output terminal of J-K flip-flop circuit 20 and a logic 1 signal is present upon the Q1 output terminal of J-K flip-flop circuit 10 and the Q2 output terminal of J-K flip-flop circuit 20. From each reset condition, the first and second occurring input signal pulse of each of the separated input signal pulse pairs operate the logic circuit of FIG. 1 in a manner just described to maintain a logic 1 signal upon the output terminal of NAND gate 21, curve H, and to produce a logic 0 output signal upon the output terminal of NAND gate 11 of a width equal to the period between the pulses of each separated input signal pulse pair, curve G.

From this description, it is apparent that NAND gate 11 produces a logic 0 output signal pulse of a width equal to the period between the pulses of each separated input signal pulse pair when the one of the pulses of each input signal pulse pair identified as curve B of FIGS. 2 and 3 is the first occurring in response to the logic 1 output signal upon the Q2 output terminal of J-K flip-flop circuit 20 triggered to the second state by the curve B pulse of each input signal pulse pair and to the logic 1 output signal upon said $\overline{Q1}$ output terminal of J-K flip-flop 10 while in the initial first state until triggered to the second state by the later occurring other pulse of each input signal pulse pair, identified as curve A of FIGS. 2 and 3.

Assuming that the other one of the pulses of each input signal pulse pair labeled "A" in FIG. 2, for purposes of identification, is the first occurring of the separated input signal pulse pairs, and that J-K flip-flop circuits 10 and 20 are in the initial first state in which a logic 0 signal is present upon the Q1 output terminal of J-K flip-flop circuit 10 and the Q2 output terminal of J-K flip-flop circuit 20, curves C and E of FIG. 3, and a logic 1 signal is present upon the $\overline{Q1}$ output terminal of J-K flip-flop circuit 10 and upon the $\overline{Q2}$ output terminal of J-K flip-flop circuit 20, curves D and F. With flip-flop circuits 10 and 20 in the initial first state, a logic 0 signal is applied to one of the input terminals of each of NAND gates 11 and 21 from the Q2 output terminal of J-K flip-flop circuit 20 and the Q1 output terminal of J-K flip-flop circuit 10, respectively. Therefore, NAND gates 11 and 21 both produce a logic 1 output signal, curves G and H. These logic 1 output signals are applied to respective input terminals of NAND gate 31 which, therefore, produces a logic 0 output signal, curve I. The logic 0 first occurring other one of the signal pulse pairs, curve A, triggers J-K flip-flop circuit 10 to the second state in which a logic 1 signal appears upon the Q1 output terminal and a logic 0 signal appears upon the $\overline{Q1}$ output terminal thereof, curves C and D. The logic 1 signal upon the Q1 output terminal of J-K flip-flop circuit 10, curve C, and upon the $\overline{Q2}$ output terminal of J-K flip-flop circuit 20, curve F, are applied to respective input terminals of NAND gate 21 which, therefore, produces a logic 0 output signal, curve H, and the logic 0 signal upon the Q2 output terminal of J-K flip-flop circuit 20, curve E, and the logic 0 signal upon the $\overline{Q1}$ output terminal of J-K flip-flop circuit 10, curve D, are applied to respective input terminals of NAND gate 11 which, therefore, maintains the logic 1 output signal, curve G. The logic 0 output signal of NAND gate 21 and the logic 1 output signal of NAND gate 11 are applied to respective input terminals of NAND gate 31 which, therefore, produces a logic 1 output signal, curve I, which triggers monostable multivibrator 15 to the alternate state in which a logic 0 signal appears upon the output terminal thereof, curve J. The logic 0 second occurring one of the input signal pulse pairs, curve B, triggers J-K flip-flop circuit 20 to the second state in which a logic 1 signal is present upon the Q2 output terminal and a logic 0 signal is present upon the $\overline{Q2}$ output terminal thereof, curves E and F. The logic 1 signal upon the Q1 output terminal of J-K flip-flop circuit 10 and the logic 0 signal present upon the $\overline{Q2}$ output terminal of J-K flip-flop circuit 20 are applied to respective input terminals of NAND gate 21 which, therefore, produces a logic 1 output signal, curve H, and the logic 0 signal upon the $\overline{Q1}$ output terminal of J-K flip-flop circuit 10 and the logic 1 signal upon the Q2 output terminal Q2 of J-K flip-flop circuit 20 are applied to respective input terminals of NAND gate 11, which, therefore, maintains the logic 1 output signal, curve G, upon the output terminal thereof. The logic 1 output signal of NAND gate 11 and the logic 1 output signal of NAND gate 21 are applied to respective input terminals of NAND gate 31 which, therefore, produces a logic 0 output signal, curve I, which is applied to the input terminal of monostable multivibrator 15 but does not affect the condition thereof. Since the delay period designed into monostable multivibrator 15 has not elapsed, this device remains in the alternate state with a logic 0 signal present upon the output terminal thereof. At the conclusion of the delay period designed into monostable multivibrator 15, it spontaneously returns to the stable state in which a logic 1 signal, curve J, is present upon the output terminal thereof which, applied to the input terminal of monostable multivibrator 25, triggers this device to the alternate state in which a logic 0 reset signal is present upon the output terminal thereof, curve K. This logic 0 reset signal is applied to the $\overline{R}$ reset input terminals of both J-K flip-flop circuits 10 and 20 to reset these devices to the initial first state in which a logic 0 signal is present upon the Q1 output terminal of J-K flip-flop circuit 10 and the Q2 output terminal of J-K flip-flop circuit 20 and a logic 1 signal is present upon the $\overline{Q1}$ output terminal of J-K flip-flop circuit 10 and the $\overline{Q2}$ output terminal of J-K flip-flop circuit 20.

From each reset condition, the first and second occurring input signal pulses of each of the separated input signal pulse pairs operate the logic circuit of FIG. 1 in a manner just described to maintain a logic 1 signal upon the output terminal of NAND gate 11, curve G, and to produce a logic 0 output signal upon the output terminal of NAND gate 21 of a width equal to the period between the pulses of each separated input signal pulse pair, curve H.

From this description it is apparent that NAND gate 21 produces a logic 0 output signal pulse of a width equal to the period between the pulses of each separated input signal pulse pair when the one of the pulses of each input signal pulse pair identified as curve A of FIGS. 2 and 3, is the first occurring in response to the logic 1 output signal upon the Q1 output terminal of J-K flip-flop circuit 10 triggered to the second state by the curve A pulse of each input signal pulse pair and to the logic 1 output signal upon the $\overline{Q2}$ output terminal of J-K flip-flop circuit 20 while in the initial first state until triggered to the second state by the later occurring other pulse of each input signal pulse pair, identified as curve B of FIGS. 2 and 3.

While specific circuit elements and electrical polarities have been set forth in this specification, it is to be specifically understood that other circuit elements having similar electrical characteristics and compatible electrical polarities may be substituted therefor.

While a preferred embodiment of this invention has been shown and described, it will be obvious to those skilled in the art that various modifications and substitutions may be made without departing from the spirit of the invention which is to be limited only within the scope of the appended claims.

What is claimed is:

1. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\overline{Q}$ output terminals, initially in a first state in which complementary logic output signals are present upon said Q and $\overline{Q}$ output terminals; means for electrically interconnecting said Q output terminal and said K input terminal and said $\overline{Q}$ output terminal and said J input terminal of each of said J-K flip-flop circuits whereby each may be triggered by a signal pulse applied to the said clock pulse input terminal thereof from said initial first state to a second state in which the said complementary logic output signals present upon said Q and $\overline{Q}$ output terminals are reversed; first input circuit means through which one of the pulses of each of said separated input signal pulse pairs may be applied to said clock pulse input terminal of one of said J-K flip-flop circuits for triggering said J-K flip-flop circuit to said second state; second input circuit means through which the other one of the pulses of each of said separated input signal pulse pairs may be applied to said clock pulse input terminal of the other one of said J-K flip-flop circuits for triggering said J-K flip-flop circuit to said second state; first circuit means for producing an output signal pulse of a width equal to the period between the pulses of each of said separated input signal pulse pairs when one pulse of each of said input signal pulse pairs is the first occurring in response to the logic output signal upon said Q output terminal of the one of said J-K flip-flop circuits triggered to said second state by said one pulse of each of said input signal pulse pairs and to the logic output signal upon said $\overline{Q}$ output terminal of the other one of said J-K flip-flop circuits while in the said initial first state until triggered to said second state by the other pulse of each of said input signal pulse pairs; second circuit means for producing an output signal pulse of a width equal to the period between the pulses of each of said separated input signal pulse pairs when the other pulse of each of said input signal pulse pairs is the first occurring in response to the logic output signal upon said Q output terminal of the one of said J-K flip-flop circuits triggered to said second state by said other pulse of each of said input signal pulse pairs and to the logic output signal upon said $\overline{Q}$ output terminal of the other one of said J-K flip-flop circuits while in the said initial first state until triggered to said second state by said one pulse of each of said input signal pulse pairs; reset circuit means responsive to said output signals of said first and second circuit means for producing a reset signal; and means for applying said reset signal to said reset input terminal of both said first and second J-K flip-flop circuits for resetting both of said J-K flip-flop circuits to said initial first state.

2. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\overline{Q}$ output terminals, initially in a first state in which a logic 0 output signal is present upon said Q output terminals and a logic 1 output signal is present upon said $\overline{Q}$ output terminals; means for electrically interconnecting said Q output terminal and said K input terminal and said $\overline{Q}$ output terminal and said J input terminal of each of said J-K flip-flop circuits whereby each may be triggered by a signal puse applied to the said clock pulse input terminal thereof from said initial first state to a second state in which a logic 1 output signal is present upon said Q output terminal and a logic 0 output signal is present upon said $\overline{Q}$ output terminal; first input circuit means through which one of the pulses of each of said separated input signal pulse pairs may be applied to said clock pulse input terminal of one of said J-K flip-flop circuits for triggering said J-K flip-flop circuit to said second state; second input circuit means through which the other one of the pulses of each of said separated input signal pulse pairs may be applied to said clock pulse input terminal of the other one of said J-K flip-flop circuits for triggering said J-K flip-flop circuit to said second state; first circuit means for producing an output signal pulse of a width equal to the period between the pulses of each of said separated input signal pulse pairs when one pulse of each of said input signal pulse pairs is the first occurring in response to the logic 1 output signal upon said Q output terminal of the one of said J-K flip-flop circuits triggered to said second state by said one pulse of each of said input signal pulse pairs and to the logic 1 output signal upon said $\overline{Q}$ output terminal of the other one of said J-K flip-flop circuits while in the said initial first state until triggered to said second state by the other pulse of each of said input signal pulse pairs; second circuit means for producing an output signal pulse of a width equal to the period between the pulses of each of said separated input signal pulse pairs when the other pulse of each of said input signal pulse pairs is the first occurring in response to the logic 1 output signal upon said Q output terminal of the one of said J-K flip-flop circuits triggered to said second state by said other pulse of each of said input signal pulse pairs and to the logic 1 output signal upon said $\overline{Q}$ output terminal of the other one of said J-K flip-flop circuits while in the said initial first state until triggered to said second state by said one pulse of each of said input signal pulse pairs; reset circuit means responsive to said output signals of said first and second circuit means for producing a reset signal; and means for applying said reset signal to said reset input terminal of both said first and second J-K flip-flop circuits for resetting both of said J-K flip-flop circuits to said initial first state.

3. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\overline{Q}$ output terminals, initially in a first state in which a logic 0 output signal is present upon said Q output terminals and a logic 1 output signal is present upon said $\overline{Q}$ output terminals; means for electrically interconnecting said Q output terminal and said K input terminal and said $\overline{Q}$ output terminal and said J input terminal of each of said J-K flip-flop circuits whereby each may be triggered by a signal pulse applied to the said clock pulse input terminal thereof from said initial first state to a second state in which a logic 1 output signal is present upon said Q output terminal and a logic 0 output signal is present upon said $\overline{Q}$ output terminal; first input circuit means through which one of the pulses of each of said separated input signal pulse pairs may be applied to said clock pulse input terminal of one of said J-K flip-flop circuits for triggering said J-K flip-flop circuit to said second state; second input circuit means through which the other one of the pulses of each of said separated input signal pulse pairs may be applied to said clock pulse input terminal of the other one of said J-K flip-flop circuits for triggering said J-K flip-flop circuit to said second state; first circuit means for producing a logic 0 output signal pulse of a width equal to the period between the pulses of each of said separated input signal pulse pairs when one pulse of each of said input signal pulse pairs is the first occurring in response to the logic 1 output signal upon said Q output terminal of the one of said J-K flip-flop circuits triggered to said second state by said one pulse of each of said input signal pulse pairs and to the logic 1 output signal upon said $\overline{Q}$ output terminal of the other one of said J-K flip-flop circuits while in the said initial first state until triggered to said second state by the other pulse of each of said input signal pulse pairs; second circuit means for producing a logic 0 output signal pulse of a width equal to the period between the pulses of each of said separated input signal pulse pairs when the other pulse of each of said input signal pulse pairs is the first occurring in response to the logic 1 output signal upon said Q output terminal of the one of said J-K flip-flop circuits triggered to said second state by said other pulse of each of said input signal pulse pairs and to the logic 1 output signal upon said $\overline{Q}$ output terminal of the other one of said J-K flip-flop circuits while in the said initial first state until triggered to said second state by said one pulse of each of said input signal pulse pairs; reset circuit means responsive to said output signals of said first and second circuit means for producing a reset signal when said output signal of one of said first and second circuit means is a logic 0; and means for applying said reset signal to said reset input terminal of both said first and second J-K flip-flop circuits for resetting both of said J-K flip-flop circuits to said initial first state.

4. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\overline{Q}$ output terminals, initially in a first state in which a logic 0 output signal is present upon said Q output terminals and a logic 1 output signal is present upon said $\overline{Q}$ output terminals; means for electrically interconnecting said Q output terminal and said K input terminal and said $\overline{Q}$ output terminal and said J input terminal of each of said J-K flip-flop circuits whereby each may be triggered by a signal pulse applied to the said clock pulse input terminal thereof; from said initial first state to a second state in which a logic 1 output signal is present upon said Q output terminal and a logic 0 output signal is present upon said $\overline{Q}$ output terminal; first input circuit means through which one of the pulses of each of said separated input signal pulse pairs may be applied to said clock pulse input terminal of one of said J-K flip-flop circuits for triggering said J-K flip-flop circuit to said second state; second input circuit means through which the other one of the pulses of each of said separated input signal pulse pairs may be applied to said clock pulse input terminal of the other one of said J-K flip-flop circuits for triggering said J-K flip-flop circuit to said second state; first gate circuit means for producing an output signal pulse of a width equal to the period between the pulses of each of said separated input signal pulse pairs when one pulse of each of said input signal pulse pairs is the first occurring in response to the logic 1 output signal upon said Q output terminal of the one of said J-K flip-flop circuits triggered to said second state by said one pulse of each of said input signal pulse pairs and to the logic 1 output signal upon said $\overline{Q}$ output terminal of the other one of said J-K flip-flop circuits while in the said initial first state until triggered to said second state by the other pulse of each of said input signal pulse pairs; second gate circuit means for producing an output signal pulse of a width equal to the period between the pulses of each of said separated input signal pulse pairs when the other pulse of each of said input signal pulse pairs is the first occurring in response to the logic 1 output signal upon said Q output terminal of the one of said J-K flip-flop circuits triggered to said second state by said other pulse of each of said input signal pulse pairs and to the logic 1 output signal upon said $\overline{Q}$ output terminal of the other one of said J-K flip-flop circuits while in the said initial first state until triggered to said second state by said one pulse of each of said input signal pulse pairs; reset circuit means responsive to said output signals of said first and second gate circuit means for producing a reset signal; and means for applying said reset signal to said reset input terminal of both said first and second J-K flip-flop circuits for resetting both of said J-K flip-flop circuits to said initial first state.

5. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\bar{Q}$ output terminals, initially in a first state in which a logic 0 output signal is present upon said Q output terminals and a logic 1 output signal is present upon said $\bar{Q}$ output terminals; means for electrically interconnecting said Q output terminal and said K input terminal and said $\bar{Q}$ output terminal and said J input terminal of each of said J-K flip-flop circuits whereby each may be triggered by a signal pulse applied to the said clock pulse input terminal thereof; from said initial first state to a second state in which a logic 1 output signal is present upon said Q output terminal and a logic 0 output signal is present upon said $\bar{Q}$ output terminal; first input circuit means through which one of the pulses of each of said separated input signal pulse pairs may be applied to said clock pulse input terminal of one of said J-K flip-flop circuits for triggering said J-K flip-flop circuit to said second state; second input circuit means through which the other one of the pulses of each of said separated input signal pulse pairs may be applied to said clock pulse input terminal of the other one of said J-K flip-flop circuits for triggering said J-K flip-flop circuit to said second state; first NAND gate circuit means for producing a logic 0 output signal pulse of a width equal to the period between the pulses of each of said separated input signal pulse pairs when one pulse of each of said input signal pulse pairs is the first occurring in response to the logic 1 output signal upon said Q output terminal of the one of said J-K flip-flop circuits triggered to said second state by said one pulse of each of said input signal pulse pairs and to the logic 1 output signal upon said $\bar{Q}$ output terminal of the other one of said J-K flip-flop circuits while in the said initial first state until triggered to said second state by the other pulse of each of said input signal pulse pairs; second NAND gate circuit means for producing a logic 0 output signal pulse of a width equal to the period between the pulses of each of said separated input signal pulse pairs when the other pulse of each of said input signal pulse pairs is the first occurring in response to the logic 1 output signal upon said Q output terminal of the one of said J-K flip-flop circuits triggered to said second state by said other pulse of each of said input signal pulse pairs and to the logic 1 output signal upon said $\bar{Q}$ output terminal of the other one of said J-K flip-flop circuits while in the said initial first state until triggered to said second state by said one pulse of each of said input signal pulse pairs; reset circuit means responsive to said output signals of said first and second NAND gate circuit means for producing a reset signal when said output signal of one of said first and second circuit means is a logic 0; and means for applying said reset signal to said reset input terminal of both said first and second J-K flip-flop circuits for resetting both of said J-K flip-flop circuits to said initial first state.

6. A circuit for producing an output signal pulse of a width equal to the period between the pulses of separated input signal pulse pairs comprising: first and second J-K flip-flop circuits, each having J and K input terminals, a clock pulse input terminal, a reset input terminal and Q and $\bar{Q}$ output terminals; means for electrically interconnecting said Q output terminal and said K input terminal and said $\bar{Q}$ output terminal and said J input terminal of each of said J-K flip-flop circuits; first input circuit means through which one of the pulses of each of said separated input signal pulse pairs may be applied to said clock pulse input terminal of one of said J-K flip-flop circuits; second input circuit means through which the other one of the pulses of each of said separated input signal pulse pairs may be applied to said clock pulse input terminal of the other one of said J-K flip-flop circuits; first, second and third NAND gate circuits each having two input and an output terminals; means for connecting said Q output terminal of one of said J-K flip-flop circuits and said $\bar{Q}$ output terminal of the other one of said J-K flip-flop circuits to respective said input terminals of said first of said NAND gate circuits; means for connecting said Q output terminal of said other one of said J-K flip-flop circuits and said $\bar{Q}$ output terminal of said one of said J-K flip-flop circuits to respective input terminals of said second of said NAND gate circuits; means for connecting said output terminal of each of said first and second NAND gate circuits to respective said input terminals of said third of said NAND gate circuits; output circuit means through which said output terminal of each of said first and second NAND gate circuits may be connected to external circuitry; first and second monostable multivibrator circuits each having an input and an output terminals; means for connecting said output terminal of said third NAND gate circuit to said input terminal of one of said monostable multivibrator circuits; means for connecting said output terminal of said one of said monostable multivibrator circuits to said input terminal of the other one of said monostable multivibrator circuits; and means for connecting said output terminal of said other one of said monostable multivibrator circuits to said reset input terminal of both of said first and second J-K flip-flop circuits.

* * * * *